P. MANN.
Animal-Trap.

No. 214,934. Patented April 29, 1879.

Attest:
H. L. Perrine,
Floyd Norris

Inventor.
Patrick Mann
By Johnson and Johnson
Atty's

UNITED STATES PATENT OFFICE.

PATRICK MANN, OF WASHINGTON, DISTRICT OF COLUMBIA.

IMPROVEMENT IN ANIMAL-TRAPS.

Specification forming part of Letters Patent No. 214,934, dated April 29, 1879; application filed March 1, 1879.

*To all whom it may concern:*

Be it known that I, PATRICK MANN, of Washington, in the District of Columbia, have invented certain new and useful Improvements in Animal-Traps, of which the following is a specification.

The improvements in animal-traps which I claim as of my invention relate to that class of traps which, while continually set, are noiseless and effective, and whose capacity for catching is only limited by size.

While some of this class are expensive and beyond the reach of housekeepers of moderate means, others lack an essential quality—viz., a capacity to be readily cleaned.

It is well known that the instinct of some pestiferous animals, notably the rat, is such that they will not approach a trap bearing evidence, to their acute perception, of its (to them) treacherous character. This evidence is indescribable, but to the animals well known, and it may be briefly stated that a trap uncleaned after the capture of a rat is the reverse of persuasive to his fellows, notwithstanding enticing baits.

My improvements consist in a construction which, while facilitating the capture of the rat, is of such a nature as to permit the trap to be perfectly cleaned.

I make a trap of two compartments, and I provide access to both of said compartments for cleansing purposes and means for readily releasing the rat to the "death" by dog or otherwise. The two compartments are upon the same floor, the entering-compartment having in its top an automatically-closing entrance, and the second or retreating compartment a trap-door for access for cleaning purposes and for the rat's exit to the death.

The construction will be hereinafter described, and the claims will fully point out such features as are of my invention.

Figure 1:
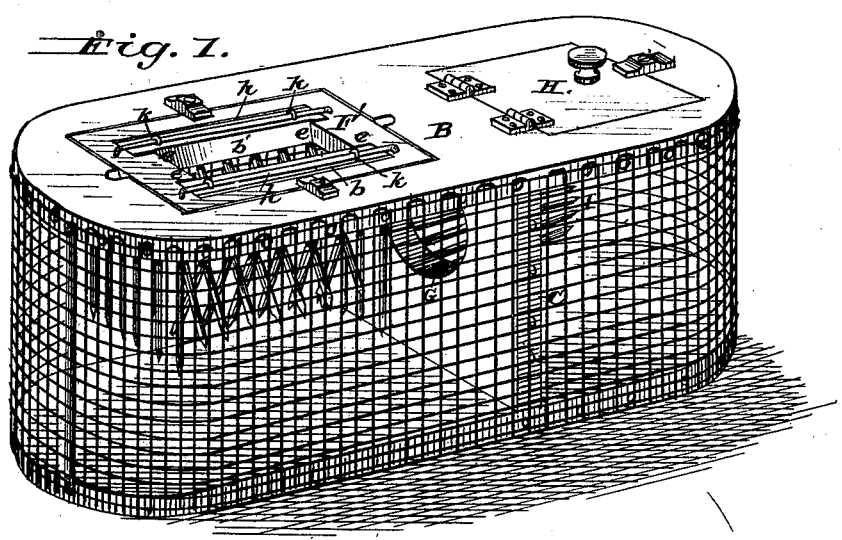
Figure 2:
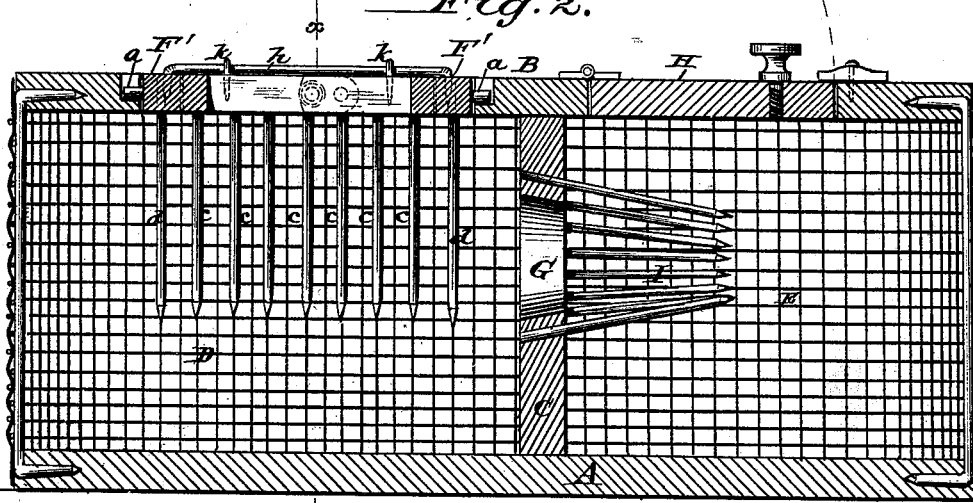
Figure 3:
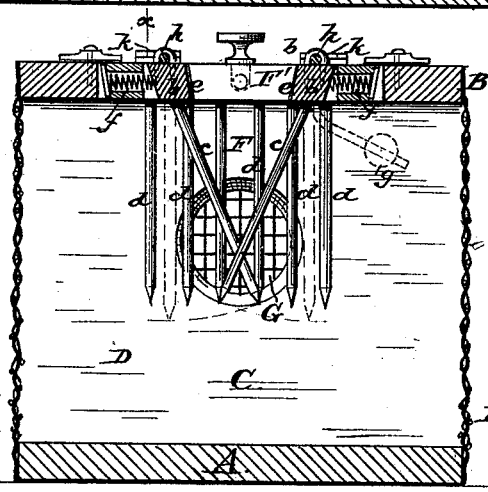

In the accompanying drawings, Figure 1 represents a perspective view of my improved rat-trap; Fig. 2, a vertical longitudinal section, and Fig. 3 a vertical transverse section on the line *x x* of Fig. 2.

In these drawings, A is the floor of the trap, and B the top. The trap is oblong, with rounded ends. The sides or walls are of wire-cloth, wire-gauze, or wire net-work. A vertical partition, C, divides the entering-compartment D from the retreating or prison compartment E, which partition should be a fixture. The ingress of the rat into the entering-compartment D is through a tapering inlet, F, of the following construction: A rectangular or square hole is made in the top of said compartment D, and a frame, F', is let in and supported by pins *a* in seats, as shown, or upon ledges. Pivoted in this frame are parallel side bars, *b b*, which carry each a series of pointed or sharpened wires, *c c*, projecting downwardly and converging from each side to cross near their ends. The ends of the rack thus formed are closed by wires *d d*, of similar construction, depending from the ends of the frame.

The two series of converging pointed wires are made to yield and make a way for the rat through the agency of their pivoted carrying-bars *b b*, which bars are so pivoted as to be stopped in their closing movement against shoulders *e e* in the frame F', and their convergence is insured either by springs *f f* in the frame, impelling the bars *b* to project their converging pointed wires together, or by a balance knob-weight, *g*. (Shown as a modification.) This weight or spring should only be sufficient to balance the tendency of the wire bars to fall from their crossed position, or to open by reason of their weight, since they are so arranged in the carrying-bars *b* as to incline each side series toward the other.

In the drawings I have shown rods *h h* fixed in the frame, from which rods the bars *b* are suspended by eyes *k k*; but said bars may be pivoted in the frame itself at their ends. These bars *b b* are so shaped as to permit of the action described of the spring or weight.

When the rat descends the tapering inlet F, to secure the bait in the entering-compartment, the side wires part, and, giving the rat free access, automatically close, and the rat is caught in the entering-compartment. Seeking an exit the rat enters the prison-compartment E through an opening, G, in the partition, protected against his retreat by barbed converging wires I, or pointed wires, and there the rat remains until killed.

The compartment E is provided with a door,

H, sufficiently large to admit of cleaning the trap—a most important matter, as before stated.

My construction of trap permits rat after rat to enter, and as many may be caged as the trap will hold, its capacity being only limited by its size.

I know that a trap has been made and sold having a tapering inlet of wire bars, but crossed at its top by a central swinging gate of similar bars, forming a double tapering inlet; but in practice, if two rats seek to enter for the bait at once in the divided openings, one opening is necessarily closed, and the ludicrous sight is observed of one rat being obliged to wait while the other enters. In that trap no provision is made for cleaning, or very inadequate and inconvenient means at least.

I claim—

1. In a rat-trap constructed substantially as herein set forth, the top removable frame, F', having the pivoted bars $b\ b$, with teeth $c\ c$ crossing at their points, and each giving way as the rat enters, said frame being provided with shoulders $e\ e$, to limit the inward turning of said bars and the crossing of their teeth, in combination with a spring or weight carried by said frame for keeping the teeth crossed in their normal positions, all constructed as shown and described.

2. A rat-trap consisting of the compartment D, having the removable top frame, in which are the pivoted bars $b\ b$, their crossing teeth $c\ c$ each giving way to open the entrance, the shoulders $e\ e$, and the springs $f\ f$, to hold said teeth, as described, and the compartment E, having the teeth-protected partition-opening G I, and the top door, H, all constructed as shown and described.

In testimony whereof I have hereunto set my hand in the presence of two subscribing witnesses.

PATRICK MANN.

Witnesses:
A. E. H. JOHNSON,
J. W. HAMILTON JOHNSON.